(12) United States Patent
Vicari et al.

(10) Patent No.: US 9,796,870 B2
(45) Date of Patent: Oct. 24, 2017

(54) STABILIZER FOR AGGRESSIVE CHEMICALS PACKAGING

(71) Applicant: Sekisui Specialty Chemicals America, LLC, Dallas, TX (US)

(72) Inventors: Richard Vicari, Houston, TX (US); Regan Pollock, Houston, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 0 days.

(21) Appl. No.: 15/255,814

(22) Filed: Sep. 2, 2016

(65) Prior Publication Data

US 2017/0058142 A1    Mar. 2, 2017

Related U.S. Application Data

(60) Provisional application No. 62/213,242, filed on Sep. 2, 2015.

(51) Int. Cl.
| | | |
|---|---|---|
| *C09D 129/04* | (2006.01) |
| *B65D 81/24* | (2006.01) |
| *B65D 65/46* | (2006.01) |
| *C09D 7/12* | (2006.01) |
| *C09D 5/00* | (2006.01) |
| *B65D 23/02* | (2006.01) |

(Continued)

(52) U.S. Cl.
CPC ........... *C09D 129/04* (2013.01); *B65D 23/02* (2013.01); *B65D 25/14* (2013.01); *B65D 65/46* (2013.01);

(Continued)

(58) Field of Classification Search
CPC .... C09D 129/04; C09D 7/1241; B65D 81/24; B65D 65/46; B65D 85/84; C08K 5/17
See application file for complete search history.

(56) References Cited

U.S. PATENT DOCUMENTS

| 5,102,950 A | 4/1992 | Terada et al. |
| 6,103,823 A | 8/2000 | Centofanti et al. |

(Continued)

FOREIGN PATENT DOCUMENTS

| EP | 0860471 A1 * | 8/1998 |
| EP | 1251147 A1 | 10/2002 |

(Continued)

OTHER PUBLICATIONS

International Search Report and Written Opinion dated Nov. 18, 2016 in corresponding International application No. PCT/US2016/050195 (12 pages).

(Continued)

*Primary Examiner* — Michael C Miggins
(74) *Attorney, Agent, or Firm* — Osha Liang LLP (57) ABSTRACT

Water soluble films and coatings herein address the problem of water insolubility, color formation, and brittleness upon exposure to oxidizing chemicals, including strong or aggressive oxidizing chemicals. The water soluble films or coatings may include a water soluble polymer and a reactive precursor, such as an alkanolamine or an alkyl alkanolamine. The reactive precursor is water soluble and reactive with oxidizing compounds. Water soluble films or coatings herein may also include a water soluble polymer and an additive mixture including an alkanolamine or an alkyl alkanolamine. The films or coatings, upon exposure to an oxidizing chemical for 8 weeks at 40° C. and ambient humidity, may dissolve fully or achieve 90% dissolution at times of less than 10 minutes. The water soluble films and coatings may advantageously be used with oxidizing chemicals while maintaining water solubility, acceptable color, and flexibility, such as in unit dose packaging, even over extended exposure periods.

20 Claims, 2 Drawing Sheets

(51) Int. Cl.
*B65D 25/14* (2006.01)
*C08K 5/17* (2006.01)
*B65D 85/84* (2006.01)
*C08K 5/05* (2006.01)

(52) U.S. Cl.
CPC ............ *B65D 81/24* (2013.01); *C09D 5/008* (2013.01); *C09D 7/1241* (2013.01); *B65D 85/84* (2013.01); *C08K 5/05* (2013.01); *C08K 5/17* (2013.01)

(56) References Cited

U.S. PATENT DOCUMENTS

| | | |
|---|---|---|
| 6,166,117 A | 12/2000 | Miyazaki |
| 6,608,121 B2 | 8/2003 | Isozaki et al. |
| 6,787,512 B1 | 9/2004 | Verrall et al. |
| 6,821,590 B2 | 11/2004 | Verrall et al. |
| 6,956,070 B2 | 10/2005 | Fujiwara et al. |
| 7,005,168 B2 | 2/2006 | Verrall et al. |
| 7,745,517 B2 | 6/2010 | Vicari et al. |
| 8,728,593 B2 | 5/2014 | Vicari et al. |
| 2004/0234739 A1 | 11/2004 | Cavalli et al. |
| 2009/0054295 A1 | 2/2009 | Vicari et al. |

FOREIGN PATENT DOCUMENTS

| | | |
|---|---|---|
| EP | 2031049 A2 * | 3/2009 |
| JP | H05310598 A | 11/1993 |

OTHER PUBLICATIONS

Database WPI; Week 199401; Thomson Scientific, London, GB; AN 1994-02244; XP-022763997 (1 page).

* cited by examiner

STABILIZER FOR AGGRESSIVE CHEMICALS PACKAGING

FIELD OF THE DISCLOSURE

Embodiments disclosed herein relate generally to water soluble films and coatings. More specifically, embodiments disclosed herein relate to water soluble films and coatings that exhibit stability when in contact with oxidizing chemicals.

BACKGROUND

The packaging or coating of various chemicals is desirable, such that the handling or direct exposure to or of the chemicals may be reduced. Where the ultimate usage of the chemical is in an aqueous system, the use of a water-soluble packaging or coating may further reduce the handling and exposure to the chemical. Unfortunately, many water-soluble polymers are reactive to oxidizing chemicals, affecting the water solubility of the polymer, the color of the polymer, and the physical properties of the polymer, such as flexibility, as the polymer remains in contact with the oxidizing chemical during storage. Insolubility, color, and brittleness occur during storage due to reaction of water soluble polymers with the oxidizing chemical being packaged.

One example of water soluble films used as a packaging material is polyvinyl alcohol (PVOH). PVOH films, for example, are commonly used as a delivery system for chemicals having relatively low reactivity or oxidizing properties, i.e. non-aggressive oxidizing chemicals, such as certain laundry or dish detergents, as the films exhibit good strength, impact resistance, and are soluble in water.

The solubility of PVOH films, however, rapidly decreases when exposed to certain chemicals, such as oxidizing chemicals, acid chemicals, alkali chemicals, chlorine-containing substances, salts with polyvalent metals, boric acid, polyamines, insecticides, and herbicides, among others. Thus, in applications which employ these types of chemicals, the use of PVOH packaging is restricted, as the effective shelf-life of the unit dose products is limited by their solubility in water.

Modified PVOH films, having co-monomers and/or various additives, have been shown to improve the chemical resistance of the films. For example, see U.S. Pat. Nos. 6,608,121, 6,166,117, 6,787,512, 6,821,590, 7,005,168,and 7,745,517, among others, disclosing use of various plasticizers, additives, and co-monomers such as N-vinylamide, carboxyl and carboxylate functional groups, and sulfonic acid functional groups.

U.S. Pat. No. 5,102,950 discloses a PVOH film formed from a copolymer consisting of vinyl alcohol units, vinyl ester units, and copolymerization units containing a 2-pyrrolidone ring. Other comonomers are also contemplated, including sulfonic acid groups, quaternary ammonium structures, and others. For use in unit-dose packaging films, it is disclosed to use plasticizers such as a polyhydric alcohol and linear sugar alcohols having 4 to 6 carbon atoms.

U.S. Pat. No. 6,956,070 and EP1251147 disclose that films containing a 2-pyrrolidone ring have a problem of insufficient cold water solubility. Instead, it is disclosed that it is possible to provide a water-soluble film simultaneously satisfying the requirements in regard to water solubility, biodegradability, and physical properties when the PVOH is modified with monomers including an N-vinylamide, a carboxyl group and lactone ring.

U.S. Pat. No. 6,166,117 discloses a water-soluble film including a sulfonic acid group modified polyvinyl alcohol in admixture with gallic acid. In this patent, it is noted that 2-acrylamido-2-methylpropanesulfonate-modified polyvinyl alcohols are unsuitable for storage of acidic chemicals for long periods of time, as they lose their function as a water-soluble film. The gallic acid is taught as necessary to achieve the desired properties.

As can be seen by the brief background above, there has been a large focus on the use of comonomers to enhance the viability of water-soluble polymers as a packaging material for oxidizing chemicals. Unfortunately, many of these efforts have not resulted in a water soluble polymer that solves the problem of water insolubility, color formation, and brittleness.

SUMMARY OF THE DISCLOSURE

Water soluble films have now been developed that address the problem of water insolubility, color formation, and brittleness upon exposure to oxidizing chemicals.

In one aspect, embodiments disclosed herein relate to a water soluble film or coating. The water soluble film or coating may include: a water soluble polymer and a reactive precursor. The reactive precursor, such as an alkanolamine or an alkyl alkanolamine, wherein the amine is a secondary or tertiary amine, and wherein the amine includes a secondary or tertiary alkanol group, is water soluble and may include a compound that reacts with an oxidizing compound.

In other embodiments, the water soluble film or coating may include: a water soluble polymer and a reactive precursor. The reactive precursor, such as an alkanolamine or an alkyl alkanolamine, wherein the amine is a secondary or tertiary amine, and wherein the amine includes a secondary or tertiary alkanol group, is water soluble and may be a compound that reacts with an oxidizing compound to form a salt. For example, the oxidizing compound may be a halogen-containing compound, and the salt may be a halogen salt. In some embodiments, the salt formed may include an amine cation, loosely or tightly binding the halogen anion.

In various embodiments, the reactive precursor may include secondary alcohol groups, such that reaction of the reactive precursor with the halogen does not result in the formation of conjugated double bonds.

In another aspect, embodiments disclosed herein relate to a water soluble film or coating. The water soluble film or coating may include less than 14 wt % water, greater than 65 wt % of a water soluble polymer, and greater than 5 wt % of a reactive precursor, such as at least 6 wt %, at least 7 wt % or at least 15 wt % reactive precursor. The reactive precursor, which may be an alkanolamine or an alkyl alkanolamine, wherein the amine is a secondary or tertiary amine, and wherein the amine includes a primary, secondary or tertiary alkanol group, is water soluble and is reactive with an oxidizing compound.

In another aspect, embodiments disclosed herein relate to a water soluble film or coating. The water soluble film or coating may include a water soluble polymer and an additive mixture including one or more of an alkanolamine or an alkyl alkanolamine, wherein the amine is a secondary or tertiary amine or a diamine, and wherein the amine includes a primary, secondary or tertiary alkanol group, excluding monoalkanol amines. The film or coating, upon exposure to an oxidizing chemical for 8 weeks at 40° C. and ambient humidity, may have greater than a 90% dissolution within a time of less than 10 minutes (D90) and a yellowness index of less than 10. In other embodiments, the film or coating, following exposure to an oxidizing chemical for 8 weeks at 40° C. and ambient humidity may have a dissolution time of less than 10 minutes.

In some embodiments, the film or coating, upon exposure to an oxidizing chemical for 8 weeks at 40° C. and ambient humidity, has a disintegration time of less than 2 minutes. The film or coating, upon exposure to an oxidizing chemical for 8 weeks at 40° C. and ambient humidity, may also not form any visible cracks in a Fold Test.

In another aspect, embodiments disclosed herein relate to a unit dose package including: a polymeric dissolution packet including the water soluble film or coating including a reactive precursor, such as described above, and a chemical sealed in the polymeric dissolution packet.

In another aspect, embodiments disclosed herein relate to a process for dispersing a chemical. The process may include: enclosing an oxidizing chemical in the water soluble film or coating including a reactive precursor, such as described above, and contacting the enclosed oxidizing chemical with water. In some embodiments, even after storing the enclosed oxidizing chemical for a time period of equal to or greater than 4 weeks before contacting the film with water, the film of the unit dose package may retain good color, flexibility, and water solubility.

Other aspects and advantages will be apparent from the following description and the appended claims.

DETAILED DESCRIPTION

Embodiments disclosed herein relate generally to water soluble films and coatings. More specifically, embodiments disclosed herein relate to water soluble films and coatings that exhibit stability when in contact with oxidizing chemicals, even chemicals having strong or aggressive oxidizing properties.

Water soluble films and coatings in embodiments herein may be formed, for example, from a water soluble polymer or a mixture of water soluble polymers. Water soluble polymers useful in embodiments herein may include, for example, polyvinyl alcohols, polyvinyl alcohol copolymers, methacrylate polymers and copolymers, ethyl acrylate polymers and copolymers, polyvinylpyrrolidone polymers and copolymers, acrylamide and methacrylamide based polymers, acrylic acid polymers, maleic acid polymers, ethylene oxide and/or propylene oxide based polymers and copolymers, acetamide polymers and copolymers, itaconic acid or itaconate polymers and copolymers, and sulfonic acid polymers and copolymers, among others.

Oxidizing chemicals may be reactive with hydroxyl groups or other reactive groups that form part of the polymer backbone, side group, or are or form part of a side chain. As one example of reaction between an oxidizing chemical and a water soluble polymer, the reaction between trichloroisocyanuric acid ("trichlor") and polyvinyl alcohol is illustrated below.

Color Formation and insolubility

The overall reaction results in the elimination of water and the formation of conjugated double bonds in the polymer chain. This leads to both color and insolubility. Similar types of reactions may occur with other water-soluble polymers, reducing the water solubility of a polymer, changing the color of the polymer, and/or affecting the physical properties of the polymer.

It has been found that various additives, as described below, may reduce or eliminate these and other reactions that may result in a dramatic change in the polymer backbone and matrix structure, such as those that affect color, water solubility, and other physical properties of the polymer. Further, as illustrated in Step 2 above, the reaction of trichlor with polyvinyl alcohol results in the formation of a free chlorine ion ($H_3O^+$ and $Cl^-$ are formed), where the chlorine is a loosely bound ion. In addition to protecting polymer properties, additives useful in some embodiments disclosed herein may also result in a more tightly bound ion.

Additives that protect the water soluble polymer during use with oxidizing chemicals may also be referred to herein as reactive precursors. Additives may include compounds or mixtures of compounds, or additive mixtures. Compositions according to embodiments herein, including films and coatings, may thus include a water soluble polymer and an additive or additive mixture that includes a reactive precursor.

Reactive precursors useful in embodiments herein may include compounds that are (a) compatible or miscible with the water soluble polymer, (b) more reactive with oxidizing compounds than the water soluble polymer, and (c) water soluble. To promote preferential reaction of the additive, it is also desirable that the reactive precursor be of a molecular weight that allows some mobility within a polymer matrix. Further, the reaction products should also be water soluble, so as to not detract from the overall goal of the water soluble film or coating, that of water solubility.

Additives useful in embodiments disclosed herein may include an alcohol amine (alkanolamine), alkyl alkanolamines, or a mixture of such amines.

Alkanol amines that may be used according to embodiments herein may include secondary or tertiary amines, including diamines. In some embodiments, the one or more alkanol groups in the alkanol amines may include at least one primary alcohol group, secondary alcohol group or tertiary alcohol group. In other embodiments, the one or more alkanol groups in the alkanol amines may include at least one secondary alcohol group or tertiary alcohol group.

Alkanolamines useful in some embodiments herein may be represented by the following structure: $NR^1R^2R^3$, where each of $R^1$, $R^2$, and $R^3$ can be hydrogen or an alkyl alcohol group, and at least two of $R^1$, $R^2$, and $R^3$ are an alkyl alcohol group, including at least one primary alcohol group, secondary alcohol group or tertiary alcohol group. In some embodiments, alkanolamines, such as various ethanolamines having low volatility may be excluded, including ethanolamine. The alkyl alcohol groups may be the same or different, and may include a mixture of primary, secondary, and/or tertiary alcohol groups.

Secondary alcohol amines useful in embodiments herein may include, for example, diisopropanol amine (bis(2-hydroxypropyl)amine), triisopropanol amine (tris(2-hydroxypropyl)amine), and N,N,N',N'-tetrakis(2-hydroxypropyl) ethylene diamine. Other secondary alcohol amines that may be used include those with 2- or 3-butanol groups, as well as amines with two or more alcohol groups and including one or more of an isopropanol group, a 2-butanol group, or a 3-butanol group. In some embodiments, a primary alcohol group (including an ethanol group) may be used in combination with a secondary alcohol group.

Primary amines, such as isopropanol amine and 1-amino-2-butanol, may also be effective reactive precursors. However, primary amines may react with chlorine-containing compounds to form dichloroamines. For some uses, such as for treatment of swimming pools, these may be undesirable byproducts, and in general such byproducts may introduce an unpleasant odor at low concentrations, such as may occur during extended storage periods. Use of such primary amines with certain oxidizing chemicals, or at relatively low concentrations in combination with secondary or tertiary amines, may be acceptable in some embodiments.

Alkyl alkanolamines useful in embodiments disclosed herein may include alkyl substituted alcohol amines, such as those described above, where the amine may be a secondary or tertiary amine. In some embodiments, the one or more alkanol groups may include a primary alcohol, secondary alcohol or tertiary alcohol. It is recognized, however, that the substituent group, if a bulky hydrocarbon, may detract from the water solubility of the additive or the resulting reaction product.

Alkyl alkanolamines may be represented by the following structures: $NR^1R^2R^3$, where each of $R^1$, $R^2$, and $R^3$ can be hydrogen, a hydrocarbon group, or an alcohol group. At least one of $R^1$, $R^2$, and $R^3$ is a hydrocarbon group, such as a C1 to C4 alkyl group. At least one of $R^1$, $R^2$, and $R^3$ is an alcohol group, such as a primary alcohol group, a secondary alcohol group, or a tertiary alcohol group. In some embodiments, when two or more alkyl alcohol groups are present, the alkyl alcohol groups may be the same or different, and may include a mixture of primary, secondary, or tertiary alcohol groups. Diamines including an alkyl bridge may also be used in embodiments herein.

Alkyl alkanolamines useful in embodiments herein may include, for example, C1-C3 alkyl substituted alkanolamines, such as 2-(methylamino)ethanol, methyl isopropanolamine, ethyl isopropanolamine, methyl ethyl isopropanolamine, dimethyl isopropanolamine (dimethyl(2-hydroxypropyl)amine), and methyl diisopropanol amine (N-methyl-N,N-bis(2-hydroxypropyl)amine), among others.

In embodiments where not excluded, other alkanolamines that may be used include methyldiethanol amine, diethanol amine, triethanol amine, n-butyl diethanol amine, and t-butyl diethanol amine, among others. In such embodiments, the use of such alkanolamines, such as diethanol amine, triethanol amine, and methyl diethanol amine, for example, may be higher than typically considered when used as a chlorine scavenger additive, and may be used, for example, in amounts of greater than 5 wt %, such as greater than 6 wt %, greater than 7 wt %, up to about 15 wt %, such as about 10 wt %, in some embodiments.

Other reactive precursors useful in embodiments herein may include low molecular weight polyvinyl alcohols, as well as low molecular weight polyvinyl alcohol copolymers, for example a sulfonate modified polyvinyl alcohol copolymer, such as a sodium allysulfonate modified polyvinyl alcohol (SAS copolymer), or an amine modified polyvinyl alcohol, such as a poly(vinyl alcohol)-copoly(vinylamine). Representative structures of a SAS copolymer and a vinyl amine copolymer are presented below.

SAS copolymer a = from 98-99+ mol %
b = from 0.1 to about 99 mol %
c = from 0.1 to about 99 mol %

When used as a reactive precursor, the molecular weight of these oligomers or polymers should be relatively low compared to the molecular weight of the water soluble polymer forming the bulk of the polymeric matrix in the resulting product. For example, where a matrix base polymer has a degree of polymerization of 500 or greater, the oligomeric or polymeric reactive precursor may have a degree of polymerization of less than 150, such as less than 100 or in the range from about 40 to 130 or from about 50 to about 90 in various embodiments.

In some embodiments, other additives that may be useful in combination with the alkanolamines and alkyl alkanolamines described above may include secondary alcohols and amino acids. Secondary alcohols that may be useful in embodiments disclosed herein may include glycerol, diglycerol, triglycerol, erythritol, glucopyranose, glucose, mannitol, and sorbitol, among others. Amino acids that may be useful in embodiments herein may include glycine, proline, alanine, valine, isoleucine, leucine, serine, aspartic acid, and glutamic acid, among others.

As noted above, the use of various reactive precursors described above may protect the water soluble polymers from oxidizing chemicals, including strong or aggressive oxidizers, while also providing additional benefits. One example of such a reaction is illustrated below, showing how triisopropanol amine may react.

Triisopropanol amine

As illustrated above, triisopropanol amine includes an amine center and three secondary alcohol groups. When contacted with trichlor, the secondary alcohols are oxidized, protecting the base water soluble polymer, such as a polyvinyl alcohol. The amine effectively neutralizes hydrochloric acid formed. Further, the secondary alcohols are positioned such that formation of conjugated double bonds is not possible, thus avoiding color formation as a result of the reaction. Additionally, the resulting compound is water soluble. Other alkanol amines and alkyl alkanolamines may result in similar reaction mechanisms, including one or more of (a) protecting the water soluble film by reaction with the oxidizing chemical, (b) limiting or preventing color formation by limiting or negating conjugated double bond formation, (c) formation of an ion that may form a salt with the oxidizing chemical or a reaction product thereof, and (d) formation of a water soluble reaction product.

Alkanolamines and alkyl alkanolamines may thus prevent packaged oxidizing chemicals from reacting with water soluble polymers, preserving properties of the water soluble film even after prolonged exposure to the oxidizing chemical. Film and coating compositions formed from a mixture of a water soluble polymer and an alkanolamine or an alkyl alkanolamine may thus have chemical resistance, while maintaining its color and flexibility. Further, as the water soluble polymer may remain largely unaffected when used in such an admixture, the films may readily dissolve in water, even after aging in the presence of an aggressive oxidizing chemical.

As will be shown in the Examples below, alkanolamines and other additives disclosed herein may provide a significant amount of protection to a water soluble polymer. For example, as described in many of the documents noted in the background, polyvinyl alcohols, without modifications such as one or more comonomers, are considered unsuitable for use with certain strong or aggressive oxidizing compounds. However, reactive precursors disclosed herein, such as alkanolamines, have been found to be effective at protecting polyvinyl alcohols.

As used herein, polyvinyl alcohol does not refer to polyvinyl alcohols formed with a comonomer, which are referred to herein as polyvinyl alcohol copolymers and described further below. Thus, reactive precursors disclosed herein, including various alkanolamines and alkyl alkanolamines, may be used, even with harsh oxidizing chemicals, where the water soluble polymer consists of or consists essentially of a polyvinyl alcohol.

Polyvinyl alcohols useful in embodiments herein may be formed by the polymerization of one or more vinyl ester monomers via bulk polymerization, solution polymerization, emulsion polymerization, or suspension polymerization, among others. Vinyl esters monomers may include various aliphatic acids, such as vinyl formate, vinyl acetate, vinyl butyrate, vinyl pivalate, and vinyl versatate, among others, for example. The vinyl ester polymer thus obtained may be saponified to form a polyvinyl alcohol. The resulting polyvinyl alcohol may have a degree of hydrolysis in the range from about 70 to about 99%, in some embodiments; in the range from about 80 to about 90% in other embodiments, as indicated by $C^{13}$NMR analyses. The polyvinyl alcohol may have a number average molecular weight in the range from about 5000 to about 500,000 or more, such as in the range from about 10,000 to about 300,000. In other embodiments, the polyvinyl alcohol may have a degree of polymerization in the range from about 100 to about 10000 or more, such as in the range from about 500 to about 5000 or from about 1000 to about 4000.

The above-noted polyvinyl alcohols may be used as the sole water soluble polymer in a water soluble film or coating formed in accordance with embodiments herein. Such polyvinyl alcohols may also be used in admixture with other water soluble polymers, if desired.

Reactive precursors may also benefit films and coatings formed from or including polyvinyl alcohol copolymers, among other water soluble polymers noted above. Polyvinyl alcohol copolymers useful in embodiments herein may include, for example, pyrrolidone copolymers, amine copolymers, carboxyl copolymers and sulfonic acid copolymers, among others. Any known process may be used to synthesize the polyvinyl alcohol copolymers, such as, but not limited to, free radical polymerization, grafting, or redox initiation. For example, copolymers useful in embodiments herein may be formed by the copolymerization of a vinyl ester monomer and a comonomer via bulk polymerization, solution polymerization, emulsion polymerization, and suspension polymerization, among others. Vinyl esters monomers may include various aliphatic acids, such as vinyl formate, vinyl acetate, vinyl butyrate, vinyl pivalate, and vinyl versatate, among others, for example. The vinyl ester copolymer thus obtained may be saponified to form a vinyl alcohol copolymer. The resulting vinyl alcohol copolymer may have a degree of hydrolysis in the range from about 60 to about 99%, in some embodiments; in the range from about 65 to about 90% in other embodiments, as indicated by $C^{13}$NMR analyses.

The polyvinyl alcohol copolymers may have a number average molecular weight in the range from about 5000 to about 500000 or more, such as in the range from about 10000 to about 300000. In other embodiments, the polyvinyl alcohol copolymers may have a degree of polymerization in the range from about 100 to about 10000 or more, such as in the range from about 500 to about 5000 or from about 1000 to about 4000.

The polyvinyl alcohol copolymer may include up to 50% of at least one comonomer. Comonomers useful in embodiments herein may include amide comonomers, amine comonomers, pyrrolidone comonomers, carboxyl comonomers and comonomers containing sulfonic acid groups, among others. In some embodiments, the comonomers may be incorporated into the polymer chain during polymerization of the vinyl ester, thus forming random vinyl alcohol copolymers. The comonomers, in various embodiments, may be incorporated into the polymer chain at a molar amount in the range from 0.5 to 25 mol % of the resulting polymer, such as in the range from 1 to 20 mol %, from 2 to 18 mol %, from 3 to 15 mol % or from 5 to 10 mol %.

Examples of pyrrolidone comonomers useful in embodiments herein may include compounds having a polymerizable carbon-carbon double bond and a pyrrolidone ring-containing group. Examples of the pyrrolidone ring-containing group include 2-oxopyrrolidin-1-yl, 3-propyl-2-oxopyrrolidin-1-yl, 5-methyl-2-oxopyrrolidin-1-yl, 5,5-dimethyl-2-oxopyrrolidin-1-yl, 3,5-dimethyl-2-oxopyrrolidin-1-yl, and the like. The carbon-carbon double bond contained in the pyrrolidone-ring-containing comonomer may include vinyl, allyl, styryl, acryloxy, methacryloxy, vinyloxy, allyloxyl, and other groups that are copolymerizable with the above noted vinyl esters of aliphatic acids and have a high alkali resistance at the time of copolymer hydrolysis to form the vinyl alcohol copolymer. Examples of the pyrrolidone-ring-containing comonomers may include N-vinyl-2-pyrrolidone, N-vinyl-3-propyl-2-pyrrolidone, N-vinyl-5-methyl-2-pyrrolidone, N-vinyl-5,5-dimethyl-2-pyrrolidone, N-vinyl-3,5-dimethyl-2-pyrrolidone, and N-allyl-2-pyrrolidone, among others.

Examples of amide comonomers useful in embodiments herein may include amide-group-containing monomers such as acrylamide, N,N-dimethyl acrylamide, N-methylolacrylamide, N-vinyl formamide, N-vinyl acetamide, and N-methyl-N-vinyl acetamide, among others.

Examples of the comonomers containing sulfonic acid groups may include vinyl sulfonic acid, allyl sulfonic acid, ethylene sulfonic acid, 2-acrylamido-1-methylpropanesulfonic acid, 2-acrylamido-2-methylpropanesulfonic acid (AMPS), 2-methacrylamido-2-methylpropanesulfonic acid, 2-sulfoethyl acrylate, and salts thereof, among others.

Examples of other comonomers that may be used according to embodiments herein may include anionic monomers, e.g. monomers containing a carboxyl group(s) such as (meth)acrylic acid, maleic acid, maleic anhydride, fumaric acid, crotonic acid, itaconic acid, etc. and salts thereof; cationic monomers, e.g. monomers having a quaternary ammonium structure such as 3-(meth)acrylamido-propyl trimethyl ammonium chloride, etc; and nonionic monomers, e.g. alpha-olefins such as ethylene and propylene; (meth) acrylates such as methyl (meth)acrylate; alkyl vinyl ethers such as ethyl vinyl ether, silyl-group-containing monomers such as trimethoxy vinylsilane; hydroxyl-group-containing monomers such as allyl alcohol, dimethylallyl alcohol and isopropenyl alcohol; acetyl-group-containing monomers including allyl acetate, dimethylallyl acetate and isopropenyl acetate but excluding vinyl acetate; halogen-atom-containing monomers such as vinyl chloride, vinylidene chloride; and aromatic monomers such as styrene, among others.

The polyvinyl alcohol copolymer may include up to 50% of at least one of the above described comonomers, such as from a lower limit of about 0.5, 0.75, 1, 1.25, 1.5, 1.75, 2, 3, 4, or 5 mole percent to an upper limit of about 4, 5, 10, 15, 20, or 25 mole percent, where any lower limit may be combined with any upper limit in various embodiments. In some embodiments, for example, the polyvinyl alcohol copolymer may include up to 15 mole percent N-vinyl pyrrolidone comonomer, such as up to 10 mole percent in some embodiments and up to 5 mole percent in other embodiments. In other embodiments, for example, the polyvinyl alcohol copolymer may include up to 10 mole percent 2-acrylamido-2-methylpropanesulfonic acid comonomer, such as in the range from about 1 to about 5 mole percent or from about 3.5 to about 4.5 mole percent. In still other embodiments, for example, the polyvinyl alcohol copolymer may include up to 15 mole percent N-vinyl formamide comonomer, such as up to 10 mole percent in some embodiments and up to 5 mole percent in other embodiments.

Compositions disclosed herein may include a mixture of two or more of the above noted polyvinyl alcohol copolymers. Compositions disclosed herein may also include a mixture of one or more of the above noted polyvinyl alcohol copolymers with one or more polyvinyl alcohols.

Optional components may also be added to the film and coating compositions disclosed herein. Optional components useful in some embodiments herein may include plasticizers, biocides, fillers, extenders, antiblocking agents, anti-slipping agents, detackifying agents, anti-foaming agents, UV stabilizers, lubricants, release agents, pigments, and dyes, among other additives. In various embodiments, compositions herein may include at least one of polyethylene glycol, glycerine, citric acid, trimethylol propane, alkoxylated trimethylol propane, potassium bicarbonate, and ammonium chloride. Plasticizers may be used, in some embodiments, in amounts ranging from about 0.1 to about 25 wt %, such as in the range from about 1 to about 20 wt % or from about 1 to about 15 wt %, from about 1 to about 10 wt %, or from 1 to about 5 wt % in other embodiments.

Water soluble compositions herein may also optionally include a saccharide component. The saccharide component includes at least one water soluble saccharide, i.e., has a solubility in water at 25° C. of at least 0.1 moles per liter. The saccharide component may include polysaccharides, oligosaccharides, disaccharides, monosaccharides, or combinations thereof. Non-limiting examples include glucose (dextrose), galactose, sucrose, fructose, lactose, maltose, mannose, trehalose, and combinations thereof. The saccharide component is preferably a mono- or di-saccharide, and is preferably crystalline.

Water soluble compositions herein may also optionally include a starch component. The starch component includes at least one water soluble starch, i.e., has a solubility in water at 25° C. of at least 0.1 moles per liter. The modified starch component may include, for example, hydroxyethyl starch, hydroxypropyl starch, hydroxybutyl starch, or other chemically modified, enzymatically modified, or physically gelatinized to increase their water solubility.

Water soluble compositions herein may further optionally include a halogen scavenger in amounts in the range from about 0.25 wt % to about 5 wt %, such as from about 0.5 wt % to about 2.5 wt %, or from about 1 wt % to about 2 wt %. Suitable halogen scavengers may include thiosulfate salts, such as sodium thiosulfate. Other halogen scavengers useful in embodiments herein may include: polymers such as polyethylene imines, polyamines, polyamineamides and polyacrylamides; anions selected from the group consisting of reducing materials like sulfite, bisulfite, thiosulfite, thiosulfate, iodide, nitrite, etc.; and antioxidants like carbamate, ascorbate, etc. and mixtures thereof. Conventional non-chlorine scavenging anions like sulfate, bisulfate, carbonate, bicarbonate, nitrate, chloride, borate, phosphate, condensed phosphate, acetate, benzoate, citrate, formate, lactate, salicylate, etc. and mixtures thereof can be used with ammonium cations. Further examples of chlorine scavengers useful in embodiments herein include ammonium sulfate, polyamino acids and their salts, fatty amines, glucosamine and other aminated sugars.

Water soluble films and coatings may be formed from compositions including one or more water soluble polymers and one or more reactive precursors, optionally with one or more of the additional components noted above. Water soluble films and coatings according to embodiments herein may include up to about 40 wt % reactive precursor and optional components, based upon a total weight of the composition. For example, water soluble films and coatings may include up to about 25 wt % reactive precursor, based on a total weight of the composition, such as from a lower limit of 0.5, 1, 1.5, 2, 2.5, 3, 3.5, 4, 5, or 10 wt % to an upper limit of 2, 3, 4, 5, 10, 15, 20, or 25 wt %, where any lower limit may be combined with any upper limit. In other embodiments, the water soluble films or coatings may include greater than 5 wt % or greater than 5.5 wt % reactive precursor, such as at least 6 wt %, at least 7 wt %, at least 8 wt %, at least 10 wt %, or greater, up to a limit of about 25 wt % reactive precursor.

The components of the water soluble compositions disclosed herein may be blended together prior to use, such as film fabrication, by any suitable means. For example, the reactive precursor may be dissolved in and/or blended with the vinyl alcohol copolymer or an aqueous solution of the vinyl alcohol copolymer.

The blend may then be used to produce water soluble films and coatings. Suitable film forming methods may include film casting, wet process film formation, dry process film formation, film extrusion, melting film formation, spray casting, as well as numerous other coating processes and film forming methods.

In some embodiments, the film is formed by a solution casting processes. An aqueous solution of the film may be prepared at about 10 to 30 percent solids by weight. The solution may then be added to a trough on a metal forming belt and a doctor blade spreads the solution out on the belt to a predetermined thickness. The belt is then passed through an oven to evaporate the water, which dries the film to a moisture content to less than 15% by weight or less than 14% by weight, such as in the range from about 5% to about 14%, 6% to 12% or other useful rages, such as from a lower limit of about 3, 4, 5, 6, 7, or 8 wt % to an upper limit of about 6, 7, 8, 9, 10, 11, 12, or 13 wt %, where any lower limit may be combined with any upper limit. The polymer films may be fabricated to a thickness in the range from about 10 to 200 microns, for example, such as from about 20 to 150 microns, or from about 50 to about 100 microns. Solution casting processes may be useful, for example, where one or more components of the blend are temperature sensitive, such as dextrose.

Various reactive precursors described above, such as various alkanolamines and alkyl alkanolamines, for example may be temperature-stable. As a result, blends using such reactive precursors, in the absence of other temperature-sensitive components such as dextrose, may advantageously be processed via melt processes, such as a film extrusion process.

Use of the reactive precursor in films and coatings according to embodiments herein may provide benefits of reduced color formation, maintenance of solubility, and retention or maintenance of mechanical properties, even when the films or coatings are placed in contact with oxidizing chemicals. For example, films and coatings according to embodiments herein may have an initial Yellowness Index (YI) of less than 5, such as in the range from about 0 to about 2. After exposure to an oxidizing chemical, even at elevated temperatures, such as at a temperature of 40° C. and at ambient humidity for 8 weeks, the films and coatings may have a YI of less than 10, such as less than 8, less than 7, less than 5, less than 3, or less than 2.

Films and coatings according to embodiments herein may also retain or maintain their flexibility. For example, films formed from blends disclosed herein may have a flexibility upon initial film formation. After exposure to an oxidizing chemical, even at elevated temperatures, such as at a temperature of 40° C. and at ambient humidity for 8 weeks, the films may retain a significant amount of their original flexibility, such as where no visible cracks when stressed through creasing or folding. For example, when subjected to a Fold Test, such as folding and creasing, the films, such as a film having a thickness of about 50 microns, may retain sufficient flexibility such that no visible cracks are observed in the sheet material at the fold area.

As an alternative test, the films may be observed for embrittlement. After exposure to the oxidizing chemical, the films may be handled and investigated with respect to changes in brittleness as compared to an unexposed film sample. An effective reactive precursor may provide for little to no embrittlement as compared to an unexposed film sample, whereas an ineffective additive may result in stiffening of the film, resulting in a brittle feel.

Films and coatings according to embodiments herein may also retain water solubility. As noted above, polyvinyl alcohols by themselves, react with oxidizing chemicals to form an insoluble film or coating, or films and coatings that are partially insoluble in water. In contrast, films and coatings according to embodiments herein may retain full water solubility. For example, after exposure to an oxidizing chemical, even at elevated temperatures, such as at a temperature of 40° C. and at ambient humidity for 8 weeks, films and coatings according to embodiments herein, such as films having a 50 micron thickness, may disintegrate when placed in 20° C. to 25° C. water, such as falling apart (not forming a cohesive film) in less than two minutes, such as within 2 to 60 seconds or within 5 to 30 seconds. Films and coatings according to embodiments herein may also have a dissolution time in 20° C. to 25° C. water of less than 10 minutes, even after exposure to an oxidizing chemical at elevated temperatures, such as at a temperature of 40° C. and at ambient humidity for 8 weeks. In various embodiments, dissolution times may be less than 8 minutes, less than 6 minutes, less than 5 minutes, or less than 3 minutes. In various embodiments, disintegration times may be less than 5 minutes, less than 3 minutes, less than 2 minutes, or less than 1 minute, such as in the range from 1 to 180 seconds or from 5 to 120 seconds. Other acceptable films and coatings may be formed where greater than 90% of the film or coating dissolves within 10 minutes (D90).

The films and coatings that may be produced according to embodiments described herein are useful for any purpose where water solubility is an advantage. As noted earlier, the films and coatings may be particularly suitable for packaging of strong oxidizing chemicals, such as may be found in agricultural chemicals, microbiocides and the like, where the chemicals in packaged form are placed into water so that the contents are dissolved or dispersed in the water. This is accomplished without the necessity of the user directly touching the harmful chemicals, and without the need to measure the chemicals, as the unit dose package contains a known quantity of the chemical.

Examples of oxidizing chemicals that may be packaged using films and coatings according to embodiments herein may include: peroxides such as barium peroxide, sodium carbonate peroxide, calcium peroxide, hydrogen peroxide, lithium peroxide, magnesium peroxide, strontium peroxide, zinc peroxide, and sodium peroxide; ketone peroxides such as acetone peroxide, methyl ethyl ketone peroxide, and benzoyl peroxide; nitrates such as aluminum nitrate, potassium nitrate, silver nitrate, calcium nitrate, sodium nitrate, cupric nitrate, lead nitrate, magnesium nitrate, strontium nitrate, nickel nitrate, and guanidine nitrate; nitrites such as sodium nitrite; chromates and dichromates such as potassium dichromate, sodium dichromate, and ammonium dichromate; sulfates and persulfates such as sodium bisulfate, ammonium persulfate, potassium persulfate and sodium persulfate; borates and perborates such as sodium perborate; perbromates and bromates such as potassium bromate and sodium bromate; permanganates such as potassium permanganates, sodium permanganate, and ammonium permanganate; chlorates and perchlorates including barium chlorate, calcium chlorate, sodium perchlorate (monohydrate), strontium chlorate, magnesium perchlorate, zinc chlorate, sodium chlorate, ammonium perchlorate and potassium chlorate; periodates and iodates such as sodium periodate and potassium periodate; chlorites and hypochlorites such as lithium hypochlorite, calcium hypochlorite, and sodium chlorite; chlorinated and/or brominated isocyanurates such as sodium dichoroisocyanuric acid, potassium dichloroisocyanuric acid, and trichloroisocyanuric acid; inorganic acids such as nitric acid, chromic acid, and perchloric acid; peroxy acids such as meta-chloroperoxybenzoic acid; potassium superoxide; hydrates of any of the preceding; and combinations of any of the preceding.

The films and coatings are particularly suitable to produce unit dose packaging for sanitizing chemicals such as those used to disinfect pools, spas, and potable water. Sanitizing chemicals include chlorine-containing compounds which produce hypochlorous acid when contacted with water. Hypochlorous acid is the effective sanitizing agent, and the amount of hypochlorous acid which can be produced by a sanitizing chemical relative to chlorine gas ($Cl_2$) is referred to as "available chlorine content." The sanitizing agents may be provided as powder, granules, tablets, liquid, gel, or any other suitable form. Sanitizing agents include hypochlorite salts such as sodium hypochlorite, calcium hypochlorite, and lithium hypochlorite; chlorinated isocyanurates such as dichloroisocyanuric acid (also referred to as "dichlor" or dichloro-s-triazinetrione, 1,3-dichloro-1,3,5-triazinane-2,4,6-trione) and trichloroisocyanuric acid (also referred to as "trichlor" or 1,3,5-trichloro-1,3,5-triazinane-2,4,6-trione). Salts and hydrates of the sanitizing compounds are also contemplated. For example, dichloroisocyanuric acid may be provided as sodium dichloroisocyanurate, sodium dichloroisocyanurate acid dihydrate, among others. Bromine containing sanitizing agents may also be suitable for use in unit dose packaging applications, such as 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin; and 2-bromo-2-nitro-1,3-propanediol, among others. Halogenated antimicrobial agents may also be suitable for use in unit dose packaging applications according to embodiments herein, such as bronopol (2-bromo-2-nitropropane-1,3-diol) and other halogenated nitroalkyl-alcohols.

While numerous oxidizing chemicals are noted above, and various film compositions are disclosed herein, one skilled in the art will recognize that various combinations of the above may work better than others. For example, a particular water-soluble polymer in combination with a reactive precursor may provide superior results with a majority of the above-listed oxidizing compounds, but may work only adequately with other chemicals. While one combination may work well with pool chemicals, that same combination may not provide the same efficacy with laundry detergent chemicals, for example.

The films described above may be formed into unit dose packaging by adding a predetermined amount of the oxidizing chemical, in granular, powder, liquid or tablet form, to the film and hermetically sealing the film around the oxidizing chemical to produce a dissolution packet that includes the active chemical agent. Alternatively, oxidizing chemicals, such as tablets, may be coated with a water soluble composition according to embodiments herein.

The films and coatings described above may exhibit stability when in contact with oxidizing chemicals, including even strong or aggressive oxidizing chemicals such as TriChlor (trichloroisocyanuric acid), among others. Stability, as used herein, refers to the films ability to maintain various physical and chemical properties, even under elevated temperature and long-term storage conditions, including a high degree of water-solubility, such as >85% or even greater than 98% or greater than 99% dissolution in 20-25 C water, low discoloration, and chemical resistance. Such films may exhibit many of the properties of plasticized PVOH films, but may retain a high degree of flexibility and film integrity, but without loss of water solubility, even following exposure of the films to the oxidizing or aggressive oxidizing chemicals noted above. Such properties are desirable in chemical packaging, as some handling is required for ultimate delivery of the unit dose package to the end target before dissolution, where such handling is typically performed after the film of the unit dose package has been aged or heat aged while in contact with the oxidizing chemical.

As described above, water soluble polymers according to embodiments herein, such as polyvinyl alcohols and polyvinyl alcohol copolymers, may be useful in packaging of oxidizing chemicals. Blends useful for forming films and coatings according to embodiments herein, exclusive of any added water, may be formulated to include, for example:
(a) 70 to 99.5 wt % water soluble polymer, and
(b) 0.5 to 30 wt % reactive precursor.

In various embodiments, blends useful for forming films and coatings according to embodiments herein may be formulated to include, for example:
(a) 70 to 99.5 wt % water soluble polymer, such as 75 to 95 wt %, 80 to 95 wt %, or 82 to 92 wt % water soluble polymer, and
(b) 0.5 to 30 wt % of an additive mixtures, such as 5 to 25 wt %, 5 to 20 wt %, or 8 to 18 wt % of an additive mixture, the additive mixture including a reactive precursor and optional components, such as a plasticizer, a surfactant, a water-soluble saccharide, a water-soluble starch, a halogen scavenger, and/or citric acid.

For example, the optional components may include one or more of dextrose, glycerine, citric acid, polyethylene glycol, trimethylol propane, and a surfactant. Surfactants useful in some embodiments herein may include water-soluble polymeric surfactants, such as polyethylene glycol type surfactants, propylene glycol type surfactants, stearates of glycerin, a poloxamer surfactant, such as PLURONIC F127, available from BASF, or monolaurin, among others.

Pluronic Surfactant

MonoLaurin

Surfactants may be used, in some embodiments, to aid in the film-forming process, at relatively low concentrations, such as less than 0.75 wt %. In other embodiments, surfactants may be used at elevated concentrations, such as in the range from 3% to about 10%, which may provide a beneficial effect on film stability and solubility when used in combination with the amine reactive precursors disclosed herein. In some embodiments, such surfactants may be used at a concentration in the range from a lower limit of 1, 2, 3, 4, 5, 6, or 7 wt % to an upper limit of 6, 7, 8, 9, 10, or 15 wt %, where any lower limit may be combined with any upper limit.

In other embodiments, the water soluble polymer may be present, exclusive of added water, in an amount from a lower limit of 60 wt %, 65 wt %, 70 wt %, 75 wt %, or 80 wt % to an upper limit of 80 wt %, 85 wt %, 90 wt %, or 95 wt %, where any lower limit may be combined with any upper limit. The remainder may be reactive precursor and optional components in any combination of percentages ranging from 5 wt % to 40 wt %. Inclusive of retained water, such as may be present from a solution casting process, films or coatings disclosed herein may include less than 14 wt % water, such as 6 wt % to 12 wt % water, and greater than 55 wt %, 60 wt %, 65 wt %, 70 wt %, or 75 wt % water soluble polymer.

The water soluble polymers used in films and coatings herein may include, for example, polyvinyl alcohols, polyvinyl alcohol copolymers, polyvinylpyrrolidones, and other various water soluble polymers, alone or in admixture. For example, compositions including mixtures of water soluble polymers may include one or more of the following combinations: two polyvinyl alcohols; a polyvinyl alcohol and a polyvinyl alcohol-co-N-vinyl pyrrolidone; a polyvinyl alcohol and a polyvinyl pyrrolidone; a polyvinyl alcohol and a polyvinyl alcohol-co-AMPS, a polyvinyl alcohol and a polyvinyl alcohol-co-SAS copolymer, and a polyvinyl alcohol and a polyvinyl alcohol-co-N-vinyl amine; among others as may be envisioned based on the water soluble polymers described above.

The reactive precursor may be present in an amount from a lower limit of 0.5 wt %, 1 wt %, 1.5 wt %, 2 wt %, 2.5 wt % or 5 wt % to an upper limit of 5 wt %, 10 wt %, 15 wt %, 20 wt %, or 25 wt %, where any lower limit may be combined with any upper limit. The amount of reactive precursor used should be sufficient to protect the base polymer, but not in excess so as to inhibit film formation or be deleterious to the physical properties (flexibility, tear strength, etc.) of the resulting films desired.

The effectiveness of a particular reactive precursor may depend upon various factors, including the particular base (matrix) polymer(s) being used in the film or coating, the molecular weight of the matrix polymer, as well as the particular oxidizing chemical being contained by or used in conjunction with the water soluble films and coatings. For example, a reactive precursor may be effective at a higher concentration for a higher molecular weight polymer and ineffective at low concentrations for the same high molecular weight polymer. In contrast, the same high concentration of reactive precursor may be deleterious to a lower molecular weight polymer, but a lower concentration may prove effective. Chain entanglements, freedom of the oxidizing chemical, polymer chain or reactive precursor to move within the polymer matrix, and other factors may impact the effective amount of reactive precursor. For example, a particular reactive precursor may have an effective range of 15 to 25 wt % in a first polymer, but may have an effective range of 7 to 15 wt % in another polymer, which may be different based on one or more of molecular weight, comonomer, or other differences. Thus, while reactive precursors according to embodiments herein have been found to be effective within the generic ranges above, it is noted that the effective range of the reactive precursor may vary within that range depending upon other variables of the film or coating composition.

Additionally, while some alcohols or alcohol containing substituent groups may form conjugated double bonds, their effectiveness as reactive precursors may be such that their use in combination with alkanolamines or alkyl alkanolamines may provide substantial benefits with respect to film or coating properties while only introducing a minor amount of unwanted color. Further, some alcohols, such as tertiary alcohol groups, may be relatively non-reactive toward various oxidizing chemicals, but inclusion of such groups or compounds may provide for water solubility of the overall system following exposure.

As can be seen, various combinations of reactive precursors described above may provide synergies for films and coatings to be used with oxidizing chemicals. For example, blends of reactive precursors envisioned may include: two or more alkanolamines; two or more alkyl alkanolamines, an alkanol amine and an alkyl alkanolamine; and an alkanol amine or an alkyl alkanolamine in combination with a primary or secondary alcohol; among others. In some embodiments, reactive precursor mixtures may include, for example two or more of N,N,N',N'-tetrakis(2-hydroxypropyl)ethylenediamine (TK2HPEDA), diisopropanol amine, and triisopropanol amine. Blends of N,N,N',N'-tetrakis(2-hydroxypropyl)ethylenediamine (TK2HPEDA), diisopropanol amine, or triisopropanol amine with primary and/or secondary alcohols may also be used.

As described above, embodiments herein provide for blends of water soluble polymers with reactive precursors. The blends may be used to advantageously form films and coatings suitable for long term contact with oxidizing chemicals. Various embodiments of these blends are provided in the Examples below.

EXAMPLES

Various compositions described herein were tested to determine their performance characteristics when used in oxidizing chemical packaging. The testing was performed according to the following test description. Films are prepared from the formulations by casting an aqueous solution of the composition onto a glass plate, which is leveled by gravity and allowed to dry to a moisture content in the range from about 6 wt % to about 15 wt %. An amount of the solution is added to the plate to provide for a film with a target thickness, which may depend on the sample target, such as 38 micron (about 1.5 mil), 50 micron (about 2 mil), 63 micron (about 2.5 mil), and 76 micron (about 3.0 mil); examples herein are made with sheets of about 50 micron thickness, although the exact thickness may vary from about 45 to about 55 microns. The water in the solution is allowed to evaporate, and the resulting films are cut into an approximately 7.6 cm by 7.6 cm square (a 3-inch by 3-inch square) or a 7.6 cm by 6.3 cm rectangle (a 3-inch by 2.5-inch rectangle). The film is then folded in half and three sides of the film are heat-sealed using a hand held heat-sealing gun. The resulting pouch is then filled with 15-20 grams of an oxidizing chemical, which may be in granular or tablet form, for example, and the fourth side of the pouch is heat sealed. The filled pouches are stored side-by-side in low density polyethylene bags. The filled pouches are then stored at selected temperature conditions and aged for a selected time period. Following aging, the filled pouches are cut open and the chemical is removed. The film thickness is measured and color recorded, and the film is tested for water solubility. A sample of the film is mounted in a slide frame and placed in a 500 ml beaker filled with 400 ml water. The beaker is placed on a magnetic stirrer, and the water is stirred with a magnetic stir bar such that a vortex is created. The water temperature is maintained as noted, such as at about 21° C. or about 23° C. The frame is secured in the beaker with a clamp which is supported by a platform such that stirring water pushes against the film. The film begins to balloon or wave. The disintegration time is recorded when the film balloon bursts. After disintegration, the frame remains in water and the dissolution time is recorded as the total time (inclusive of disintegration time) when no residual strings of film and no film particles remain on the frame.

Comparative Examples 1-3

Comparative Examples 1-3 illustrate the performance of a PVOH-co-AMPS polymer when exposed to the oxidizing chemical TriChlor (trichloroisocyanuric acid). The co-AMPS polymer used was ULTILOC 2012, available from Sekisui Specialty Chemicals, Houston, Tex. Three test specimens were formed, including:

Comparative Example 1, ULTILOC 2012, without any additives;
Comparative Example 2, ULTILOC 2012 plus 10 wt % polyethylene glycol plasticizer, PEG 400, having a number average molecular weight of about 400; and
Comparative Example 3, ULTILOC 2012 plus 10 wt % dextrose.

Each of Comparative Examples 1-3 also included a minor amount of a surfactant, TRITON X-100, a non-ionic surfactant, for use during film formation.

The test specimens were formed into unit dose packages and filled with TriChlor as described above. The samples were then tested for water solubility after extended exposure. The dissolution test results are provided in Table 1, showing the dissolution times, in seconds, for each of the test specimens. As used throughout the tables, DND indicates the sample did not completely dissolve, and D90 indicates that, while not dissolving completely, greater than 90% of the sample dissolved within 10 minutes.

TABLE 1

Dissolution time (in seconds) for Comparative Examples 4-6.

| Exposure (Days) | 0 | 6 | 13 | 26 | 34 | 62 |
| --- | --- | --- | --- | --- | --- | --- |
| Comp. Ex. 1 | 35 | 36 | DND | DND | DND | DND |
| Comp. Ex. 2 | 29 | DND | DND | DND | DND | DND |
| Comp. Ex. 3 | 41 | 45 | 51 | 46 | 49 | 47 |

As shown in the table above, the co-AMPS polymer alone reacted with the TriChlor to result in an insoluble polymer. The use of a glycol, polyethylene glycol, was also insufficient, also resulting in an insoluble polymer upon extended exposure. The sample with dextrose remained water soluble. Although not expanded upon in detail, the sample with dextrose did show some coloring, and it is noted that the formulations with dextrose cannot be melt extruded.

Examples 1-6

Examples 1-6 illustrate the performance of a PVOH-co-AMPS polymer when exposed to the oxidizing chemical TriChlor (trichloroisocyanuric acid). The co-AMPS polymer used was ULTILOC 2012, available from Sekisui Specialty Chemicals, Houston, Tex. Reactive precursors used include bis(2-hydroxypropyl)amine, triisopropanolamine, and N,N,N',N'-tetrakis(2-hydroxypropyl)ethylenediamine (TK2HPEDA). The test specimens were formulated as shown in Table 2.

TABLE 2

| Sample | Component | Wt % |
| --- | --- | --- |
| Example 1 | ULTILOC 2012 | 94.5 |
|  | TK2HPEDA | 5.0 |
|  | TRITON X-100 | 0.5 |
| Example 2 | ULTILOC 2012 | 89.5 |
|  | TK2HPEDA | 10.0 |
|  | TRITON X-100 | 0.5 |
| Example 3 | ULTILOC 2012 | 94.5 |
|  | Bis(2-Hydroxypropyl)amine | 5.0 |
|  | TRITON X-100 | 0.5 |
| Example 4 | ULTILOC 2012 | 89.5 |
|  | Bis(2-Hydroxypropyl)amine | 10.0 |
|  | TRITON X-100 | 0.5 |
| Example 5 | ULTILOC 2012 | 94.5 |
|  | Triisopropanolamine | 5.0 |
|  | TRITON X-100 | 0.5 |
| Example 6 | ULTILOC 2012 | 89.5 |
|  | Triisopropanolamine | 10.0 |
|  | TRITON X-100 | 0.5 |

Figure 1:
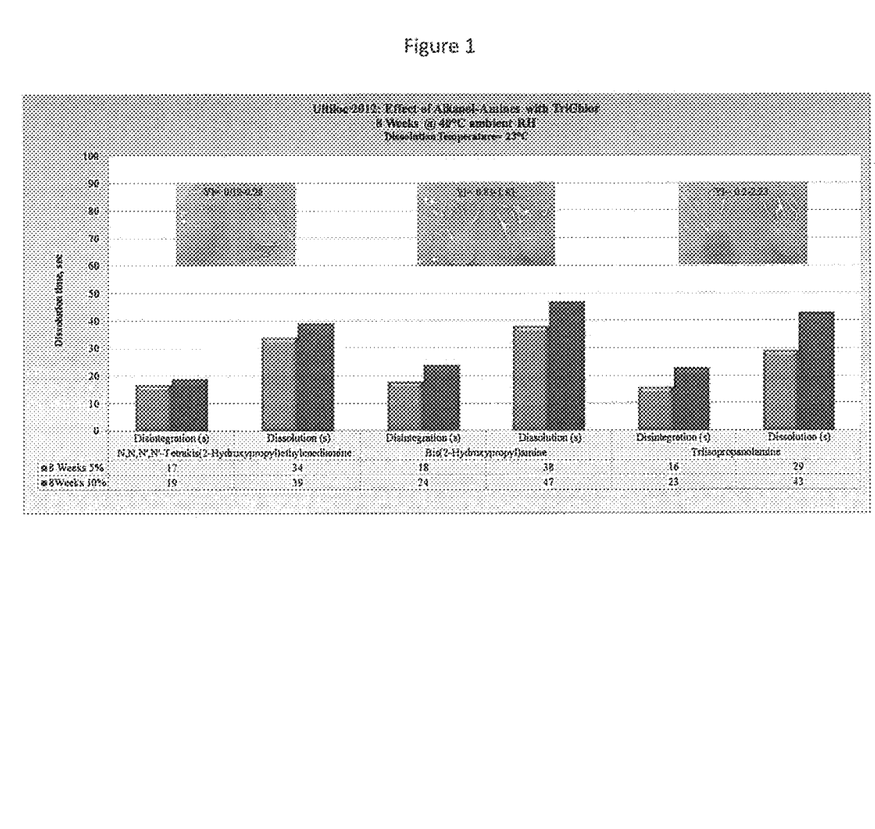
FIG. 1 is a chart illustrating test results for water soluble films according to embodiments herein.

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 3 (8 weeks exposure) and illustrated in FIG. 1. "Feel," as used in the tables herein, refers to a subjective measure of the films flexibility, on a scale from 1 to 5, 1 being flexible, 3 being pliable, and 5 being brittle.

TABLE 3

| Sample | Disintegration (s) | Dissolution (s) | Feel | YI D1925(2/C) |
| --- | --- | --- | --- | --- |
| Example 1 | 17 | 34 | 3 | 0.12 |
| Example 2 | 19 | 39 | 3 | 0.25 |
| Example 3 | 18 | 38 | 2 | 0.83 |
| Example 4 | 24 | 47 | 1 | 1.83 |
| Example 5 | 16 | 29 | 3 | 0.2 |
| Example 6 | 23 | 43 | 3 | 2.23 |

Each of Examples 1-6, including a co-AMPS copolymer and an alkanol amine reactive precursor, show excellent solubility and YI<10, even after 8 weeks of exposure to TriChlor at 40° C. and ambient humidity. Some of the samples were "pliable," although none were observed as being brittle. Further, the color of each of the samples, even after 8 weeks of exposure, showed little yellowing, having a YI of less than 4 for all samples; most had a YI of less than 2, which indicates excellent color retention.

Comparative Examples 4-6

Comparative Examples 4-6 illustrate the performance of a PVOH polymer when exposed to the oxidizing chemical TriChlor (trichloroisocyanuric acid). The PVOH used was SELVOL 205, available from Sekisui Specialty Chemicals, Houston, Tex., and having a degree of hydrolysis of about 88%, and a 4% solution viscosity of about 5.7 cP. Three test specimens were formed, including:

Comparative Example 4, SELVOL 205, without any additives;
Comparative Example 5, SELVOL 205 plus 10 wt % polyethylene glycol plasticizer, PEG 400, having a number average molecular weight of about 400; and
Comparative Example 6, SELVOL 205 plus 10 wt % dextrose.

Each of Comparative Examples 1-3 also included a minor amount of a surfactant for use during film formation.

The test specimens were formed into unit dose packages and filled with TriChlor as described above. The samples were then tested for water solubility after extended exposure. The dissolution test results are provided in Table 4, showing the dissolution times, in seconds, for each of the test specimens.

TABLE 4

Dissolution Time for Comparative Examples 4-6.

| Exposure (Days) | 0 | 6 | 13 | 26 |
|---|---|---|---|---|
| Comp. Ex. 4 | 25 | DND | DND | DND |
| Comp. Ex. 5 | 35 | DND | DND | DND |
| Comp. Ex. 6 | 55 | 65 | 63 | DND |

As seen in the table above, polyvinyl alcohols by themselves are generally unsuitable for use with oxidizing chemicals. This is true regardless of the molecular weight (4% viscosity) of the polyvinylalcohol. Further, as shown by Comparative Example 6, even the addition of dextrose, which proved successful with the co-AMPS in Comparative Example 3, was not sufficient to protect the polymer film from degradation, forming a water insoluble polymer after extended exposure.

Examples 7-9

Examples 7-9 illustrate the performance of a PVOH polymer in combination with an alkanolamine reactive precursor when exposed to the oxidizing chemical TriChlor (trichloroisocyanuric acid). The PVOH used was SELVOL 513, available from Sekisui Specialty Chemicals, Houston, Tex., and having a degree of hydrolysis of about 88%, and a 4% solution viscosity of about 14 cP. The test specimens were formulated as shown in Table 5.

TABLE 5

| Sample | Component | Wt % |
|---|---|---|
| Example 7 | SELVOL 513 | 89.5 |
|  | TK2HPEDA | 10.0 |
|  | Triton X-100 | 0.5 |
| Example 8 | SELVOL 513 | 89.5 |
|  | Bis(2-Hydroxypropyl)amine | 10.0 |
|  | Triton X-100 | 0.5 |
| Example 9 | SELVOL 513 | 89.5 |
|  | Triisopropanolamine | 10.0 |
|  | Triton X-100 | 0.5 |

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 6 (8 weeks exposure).

TABLE 6

| Sample | Disintegration (s) | Dissolution (s) | Feel | YI D1925(2/C) |
|---|---|---|---|---|
| Example 7 | 31 | 489 | 3 | 1.47 |
| Example 8 | 42 | 140 | 1 | 3.41 |
| Example 9 | 60 | DND | 3 | 1.91 |

Each of Examples 7-9 included a PVOH and an alkanol amine reactive precursor. The samples with TK2HPEDA and diisopropanol amine show excellent solubility and YI<10, even after 8 weeks of exposure to TriChlor at 40° C. and ambient humidity. The sample with diisopropanol amine also had excellent flexibility. The specimens with triisopropanol amine were not as well protected, and resulted in insoluble polymer after exposure. Some of the samples were "pliable," although none were observed as being brittle. Further, the color of each of Examples 7-9, even after 8 weeks of exposure, showed little yellowing, having a YI of less than 4 for all samples.

Examples 10-15

Examples 10-15 illustrate the performance of a PVOH-co-N-vinyl pyrrolidone polymer in combination with an alkanolamine reactive precursor when exposed to the oxidizing chemical TriChlor (trichloroisocyanuric acid). The PVOH used was ULTILOC 4005, available from Sekisui Specialty Chemicals, Houston, Tex. The test specimens were formulated as shown in Table 7.

TABLE 7

| Sample | Component | Wt % |
|---|---|---|
| Example 10 | ULTILOC 4005 | 94.5 |
|  | TK2HPEDA | 5.0 |
|  | TRITON X-100 | 0.5 |
| Example 11 | ULTILOC 4005 | 89.5 |
|  | TK2HPEDA | 10.0 |
|  | TRITON X-100 | 0.5 |
| Example 12 | ULTILOC 4005 | 94.5 |
|  | Bis(2-Hydroxypropyl)amine | 5.0 |
|  | TRITON X-100 | 0.5 |
| Example 13 | ULTILOC 4005 | 89.5 |
|  | Bis(2-Hydroxypropyl)amine | 10.0 |
|  | TRITON X-100 | 0.5 |
| Example 14 | ULTILOC 4005 | 94.5 |
|  | Triisopropanolamine | 5.0 |
|  | TRITON X-100 | 0.5 |
| Example 15 | ULTILOC 4005 | 89.5 |
|  | Triisopropanolamine | 10.0 |
|  | TRITON X-100 | 0.5 |

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 8 (8 weeks exposure).

TABLE 8

| Sample | Disintegration (s) | Dissolution (s) | Feel | YI D1925(2/C) |
|---|---|---|---|---|
| Example 10 | 67 | 247 | 3 | 0.17 |
| Example 11 | 26 | 120 | 3 | 1.26 |

TABLE 8-continued

| Sample | Disintegration (s) | Dissolution (s) | Feel | YI D1925(2/C) |
|---|---|---|---|---|
| Example 12 | 48 | 158 | 3 | 0.75 |
| Example 13 | 35 | 85 | 3 | 0.79 |
| Example 14 | 71 | D90 | 3 | 0.27 |
| Example 15 | 103 | D90 | 4 | 4.5 |

Each of Examples 10-15 included a PVOH-co-NVP copolymer and an alkanol amine reactive precursor. The samples with diisopropanol amine show excellent solubility and YI<10, even after 8 weeks of exposure to TriChlor at 40° C. and ambient humidity. The specimens with triisopropylamine were not as well protected, and resulted in insoluble polymer after exposure, however, greater than 90% dissolved in 10 minutes. Some of the samples were "pliable," although none were observed as being brittle. Further, the color of each of Examples 10-15, even after 8 weeks of exposure, showed little yellowing, having a YI of less than 4 for all but one sample.

Comparative Examples 7

Comparative Example 7 illustrates the performance of another PVOH polymer when exposed to the oxidizing chemical TriChlor (trichloroisocyanuric acid). The PVOH used was SELVOL 513, available from Sekisui Specialty Chemicals, Houston, Tex., and having a degree of hydrolysis of about 88%, and a 4% solution viscosity of about 14 cP. The test specimens formed included SELVOL 513 without any additives, except for a minor amount of a surfactant for use during film formation.

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 9 (8 weeks exposure).

TABLE 9

Test Results for Comparative Example 7.

| Specimen | Disintegration (s) | Dissolution (s) | Feel | YI |
|---|---|---|---|---|
| Comp. Ex. 7 | DND | DND | 4 | 1.62 |

As seen in the table above, this polyvinyl alcohol, by itself, is generally unsuitable for use with oxidizing chemicals, forming an inflexible, water insoluble polymer after extended exposure.

Examples 16-22

Examples 16-22 illustrate the performance of a PVOH polymer in combination with varying concentrations of diisopropanolamine as a reactive precursor when exposed to the oxidizing chemical TriChlor (trichloroisocyanuric acid). The PVOH used was SELVOL 513, available from Sekisui Specialty Chemicals, Houston, Tex. The test specimens were formulated as shown in Table 10, where each sample included 0.5 wt % surfactant and the balance SELVOL 513.

TABLE 10

| Sample | Diisopropanolamine |
|---|---|
| Example 16 | 0.5 wt % |
| Example 17 | 1.0 |
| Example 18 | 2.5 |
| Example 19 | 5 |
| Example 20 | 10 |
| Example 21 | 15 |
| Example 21 | 20 |

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 11 (8 weeks exposure).

TABLE 11

| Sample | Diisopropanol amine (wt %) | Disintegration (s) | Dissolution (s) | Feel | YI D1925(2/C) |
|---|---|---|---|---|---|
| Example 16 | 0.5 | DND | DND | 4 | 4.84 |
| Example 17 | 1.0 | 97 | 440 | 3 | 3.14 |
| Example 18 | 2.5 | 94 | 382 | 3 | 3.59 |
| Example 19 | 5 | 56 | 146 | 3 | 2.96 |
| Example 20 | 10 | 42 | 140 | 2 | 3.41 |
| Example 21 | 15 | 55 | 112 | 2 | 9.53 |
| Example 22 | 20 | DND | DND | 1 | 13.6 |

Each of Examples 16-22 included a PVOH and an alkanol amine reactive precursor. The sample with only 0.5 wt % diisopropanol amine and that with 20 wt % did not dissolve, the sample with 20 wt % reactive precursor also exhibiting color greater than desired (YI<10 desired). Diisopropanol amine amounts of 1 wt % to 15 wt % show excellent solubility and color (YI of <10 for all, less than 4 for all but 15 wt % diisopropanol amine), even after 8 weeks of exposure to TriChlor at 40° C. and ambient humidity.

Examples 23-25

Examples 23-25 illustrate the performance of a PVOH polymer in combination with an alkanolamine reactive precursor and an additional surfactant additive when exposed to the oxidizing chemical TriChlor (trichloroisocyanuric acid). The PVOH used was SELVOL 513, available from Sekisui Specialty Chemicals, Houston, Tex., and the additional surfactant was either PLURONIC F127, available from BASF, or monolaurin. The test specimens were formulated as shown in Table 12.

TABLE 12

| Sample | Component | Wt % |
|---|---|---|
| Example 23 | SELVOL 513 | 87.0 |
|  | TK2HPEDA | 10 |
|  | TRITON X-100 | 0.5 |
|  | PLURONIC F127 | 2.5 |
| Example 24 | SELVOL 513 | 84.5 |
|  | TK2HPEDA | 10.0 |
|  | TRITON X-100 | 0.5 |
|  | PLURONIC F127 | 5.0 |

TABLE 12-continued

| Sample | Component | Wt % |
| --- | --- | --- |
| Example 25 | SELVOL 513 | 83.5 |
| | TK2HPEDA | 10.0 |
| | TRITON X-100 | 0.5 |
| | PLURONIC F127 | 5.0 |
| | Monolaurin | 1.0 |

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 13 (8 weeks exposure).

TABLE 13

| Sample | Disintegration (s) | Dissolution (s) | Feel | YI D1925(2/C) |
| --- | --- | --- | --- | --- |
| Example 7 | 31 | 489 | 3 | 1.47 |
| Example 23 | 38 | 110 | 3 | 0.22 |
| Example 24 | 42 | 113 | 3 | 0.11 |
| Example 25 | 42 | 253 | 3 | 1.3 |

Each of Examples 23-25 included a PVOH, an alkanol amine reactive precursor, and a starch. The surfactants appeared to have a positive impact on dissolution and compatibility as compared to formulations without the surfactant (Example 7, described above and included in Table 13 for ease of reference). Each of Examples 23-25 had excellent solubility and color, even after 8 weeks of exposure to TriChlor at 40° C. and ambient humidity.

Examples 26-27

Examples 26-27 illustrate the performance of a PVOH polymer in combination with a methyldiethanolamine as the reactive precursor when exposed to the oxidizing chemical TriChlor (trichloroisocyanuric acid). The PVOH used was SELVOL 513, available from Sekisui Specialty Chemicals, Houston, Tex. The test specimens were formulated as shown in Table 14.

TABLE 14

| Sample | Component | Wt % |
| --- | --- | --- |
| Example 26 | SELVOL 513 | 94.5.0 |
| | Methyldiethanol amine | 5.0 |
| | TRITON X-100 | 0.5 |
| Example 27 | SELVOL 513 | 89.5 |
| | Methyldiethanol amine | 10.0 |
| | TRITON X-100 | 0.5 |

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 15 (8 weeks exposure).

TABLE 15

| Sample | Disintegration (s) | Dissolution (s) | Feel | YI D1925(2/C) |
| --- | --- | --- | --- | --- |
| Example 26 | 53 | 142 | 3 | 0.48 |
| Example 27 | 28 | 56 | 2 | 2.12 |

Figure 2:
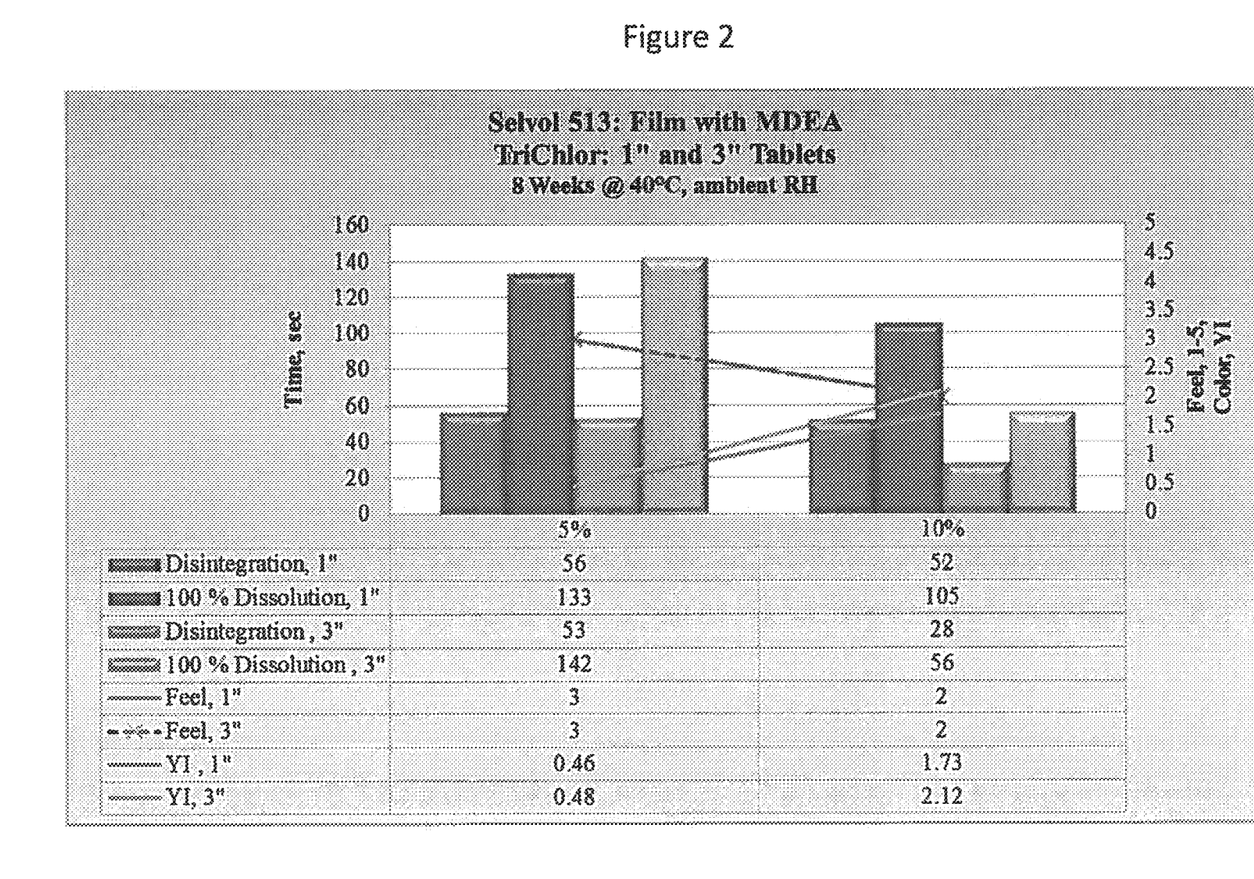
FIG. 2 is a chart illustrating test results for other water-soluble films according to embodiments herein.

Each of Examples 26-27 had excellent solubility and color, even after 8 weeks of exposure to TriChlor at 40° C. and ambient humidity. The tests results above are with respect to 3-inch tablets of TriChlor. Tests were also performed with 1-inch tablets, to determine if surface area of contact had any significant impact on results. The 1-inch and 3-inch table results are compared in FIG. 2.

Examples 28-31

Examples 28-31 illustrate the performance of a PVOH polymer in combination with either diethanolamine or triethanolamine as the reactive precursor when exposed to the oxidizing chemical TriChlor (trichloroisocyanuric acid). The PVOH used was SELVOL 513, available from Sekisui Specialty Chemicals, Houston, Tex. The test specimens were formulated as shown in Table 16.

TABLE 16

| Sample | Component | Wt % |
| --- | --- | --- |
| Example 28 | SELVOL 513 | 94.5.0 |
| | triethanol amine | 5.0 |
| | TRITON X-100 | 0.5 |
| Example 29 | SELVOL 513 | 89.5 |
| | triethanol amine | 10.0 |
| | TRITON X-100 | 0.5 |
| Example 30 | SELVOL 513 | 94.5 |
| | diethanol amine | 5.0 |
| | TRITON X-100 | 0.5 |
| Example 31 | SELVOL 513 | 89.5 |
| | diethanol amine | 10.0 |
| | TRITON X-100 | 0.5 |

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 17 (8 weeks exposure).

TABLE 17

| Sample | Disintegration (s) | Dissolution (s) | Feel | YI D1925(2/C) |
| --- | --- | --- | --- | --- |
| Example 28 | 38 | 94 | 3 | 0.49 |
| Example 29 | 28 | 54 | 1 | 6.08 |
| Example 30 | 54 | 107 | 1 | 2.12 |
| Example 31 | 113 | 234 | 1 | 7.57 |

Each of Examples 28-31 had excellent solubility and color, even after 8 weeks of exposure to TriChlor at 40° C. and ambient humidity.

Examples 32-39

Examples 32-39 illustrate the performance of a PVOH polymer in combination with methyldiethanol amine as the alkanolamine reactive precursor in combination with additional additives when exposed to the oxidizing chemical TriChlor (trichloroisocyanuric acid). The PVOH used was SELVOL 513, available from Sekisui Specialty Chemicals, Houston, Tex., and the additional surfactant was either PLURONIC F127, available from Sigma Aldrich, or monolaurin. The test specimens were formulated as shown in Table 18.

TABLE 18

| Sample | Component | Wt % |
|---|---|---|
| Example 32 | SELVOL 513 | 84.5 |
| | Methyldiethanol amine | 10 |
| | TRITON X-100 | 0.5 |
| | Glycerine | 5.0 |
| Example 33 | SELVOL 513 | 84.5 |
| | Methyldiethanol amine | 10.0 |
| | TRITON X-100 | 0.5 |
| | TMP | 5.0 |
| Example 34A | SELVOL 513 | 84.5 |
| | Methyldiethanol amine | 10.0 |
| | TRITON X-100 | 0.5 |
| | STARAMIC 747 | 5.0 |
| Example 34B | SELVOL 513 | 84.5 |
| | Methyldiethanol amine | 10.0 |
| | TRITON X-100 | 0.5 |
| | STARAMIC 747 | 5.0 |
| Example 35 | SELVOL 513 | 84.5 |
| | Methyldiethanol amine | 10.0 |
| | TRITON X-100 | 0.5 |
| | PEG 600 | 5.0 |
| Example 36 | SELVOL 513 | 84.5 |
| | Methyldiethanol amine | 10.0 |
| | TRITON X-100 | 0.5 |
| | 2-methyl-1,3-propanediol | 5.0 |

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 19 (8 weeks exposure).

TABLE 19

| Sample | Disintegration (s) | Dissolution (s) | Feel | YI D1925(2/C) |
|---|---|---|---|---|
| Example 32 | DND | DND | 1 | 20.38 |
| Example 33 | DND | DND | 1 | 1.71 |
| Example 34A | 29 | 57 | 1 | 1.38 |
| Example 34B | 33 | 92 | 1 | 0.86 |
| Example 35 | DND | DND | 1 | 22.31 |
| Example 36 | DND | DND | 1 | 7.84 |

Each of Examples 32-36 included a PVOH, an alkanol amine reactive precursor, and an additional additive. The samples including glycerine, TMP (trimethylol propane), PEG 600, and 2-methyl-1,3-propanediol did not dissolve. Sample 34, including STARAMIC 747, a hydroxyethyl starch that is soluble in water, showed excellent dissolution, compatibility, color, and feel, even after 8 weeks of exposure to TriChlor at 40° C. and ambient humidity.

Examples 37-40

Examples 37-40 illustrate the performance of a PVOH polymer in combination with either n-butyldiethanolamine or t-butyldiethanolamine as the reactive precursor when exposed to the oxidizing chemical TriChlor (trichloroisocyanuric acid). The PVOH used was SELVOL 513, available from Sekisui Specialty Chemicals, Houston, Tex. The test specimens were formulated as shown in Table 20.

TABLE 20

| Sample | Component | Wt % |
|---|---|---|
| Example 37 | SELVOL 513 | 94.5.0 |
| | t-butyldiethanol amine | 5.0 |
| | TRITON X-100 | 0.5 |
| Example 38 | SELVOL 513 | 89.5 |
| | t-butyldiethanol amine | 10.0 |
| | TRITON X-100 | 0.5 |
| Example 39 | SELVOL 513 | 94.5 |
| | n-butyldiethanol amine | 5.0 |
| | TRITON X-100 | 0.5 |
| Example 40 | SELVOL 513 | 89.5 |
| | n-butyldiethanol amine | 10.0 |
| | TRITON X-100 | 0.5 |

The test specimens were formed into unit dose packages and filled with TriChlor as described above. The samples were then tested for water solubility (at 23° C.), feel (tactile test), and color, among other properties, after extended exposure. The color test was performed according to ASTM Method D1925. The test results are summarized in Table 21 (8 weeks exposure).

TABLE 21

| Sample | Disintegration (s) | Dissolution (s) | Feel | YI D1925(2/C) |
|---|---|---|---|---|
| Example 37 | 44 | DND | 3 | 0.37 |
| Example 38 | 51 | 123 | 3 | 1.16 |
| Example 39 | 33 | 68 | 3 | 0.98 |
| Example 40 | 34 | 64 | 2 | 4.26 |

Each of Examples 38-40 exhibited good solubility and color, even after 8 weeks of exposure to TriChlor at 40° C. and ambient humidity.

As shown by the Examples above, reactive precursors as described herein, including alkanolamines, may be used to effectively protect a water soluble polymer, such as a polyvinyl alcohol or a polyvinyl alcohol copolymer, from deleterious attack by an oxidizing chemical. It is further postulated that the alkanolamines may be beneficial in combination with polymer mixtures and in admixture with other additives, such as dextrose and various plasticizers. Some non-limiting formulations contemplated include those summarized in Tables 22A-22C below.

TABLE 22A

| | Formulation | | | | | |
|---|---|---|---|---|---|---|
| Ingredients | 1 | 2 | 3 | 4 | 5 | 6 |
| Ultiloc 2012 | 87.77% | 87.77% | 87.77% | | | |
| Ultiloc 4005 | | | | | | |
| Selvol 513 | | | | 84.47% | 84.47% | 84.47% |
| Glycerine | 2.00% | 2.00% | 2.00% | 6.00% | 6.00% | 6.00% |
| TMP | 5.00% | 5.00% | 5.00% | 1.80% | 1.80% | 1.80% |
| PEG 600 | | | | 2.50% | 2.50% | 2.50% |
| Dextrose | | | | | | |
| Triton X100 | 0.23% | 0.23% | 0.23% | 0.23% | 0.23% | 0.23% |
| TK2HPEDA | 5.00% | | | 5.00% | | |
| Bis(2-Hydroxypropyl) amine | | 5.00% | | | 5.00% | |
| Triisopropanolamine | | | 5.00% | | | 5.00% |

TABLE 22B

| Ingredients | Formulation | | | | | |
| --- | --- | --- | --- | --- | --- | --- |
| | 7 | 8 | 9 | 10 | 11 | 12 |
| Ultiloc 2012 | | | | 68.08% | 68.08% | 68.08% |
| Ultiloc 4005 | 93.77% | 93.77% | 93.77% | 22.69% | 22.69% | 22.69% |
| Selvol 513 | | | | | | |
| Glycerine | | | | 4.00% | 4.00% | 4.00% |
| TMP | | | | | | |
| PEG 600 | | | | | | |
| Dextrose | 2.00% | 2.00% | 2.00% | | | |
| Triton X100 | 0.23% | 0.23% | 0.23% | 0.23% | 0.23% | 0.23% |
| TK2HPEDA | 5.00% | | | 5.00% | | |
| Bis(2-Hydroxypropyl) amine | | 5.00% | | | 5.00% | |
| Triisopropanolamine | | | 5.00% | | | 5.00% |

TABLE 22C

| Ingredients | Formulation | | |
| --- | --- | --- | --- |
| | 13 | 14 | 15 |
| Ultiloc 2012 | 70.33% | 70.33% | 70.33% |
| Ultiloc 4005 | 23.44 | 23.44 | 23.44 |
| Selvol 513 | | | |
| Glycerine | 1.00% | 1.00% | 1.00% |
| TMP | | | |
| PEG 600 | | | |
| Dextrose | | | |
| Triton X100 | 0.23% | 0.23% | 0.23% |
| TK2HPEDA | 5.00% | | |
| Bis(2-Hydroxypropyl)amine | | 5.00% | |
| Triisopropanolamine | | | 5.00% |

Film compositions disclosed herein, may exhibit stability, including low discoloration, retention of flexibility, and a high degree of solubility in water, even after exposure to oxidizing chemicals and heat aging. Advantageously, various reactive precursors may be used in combination with polyvinyl alcohols to result in stable films and coatings, negating the need for expensive comonomers and copolymerization processes to produce films and coatings suitable for use with various oxidizing chemicals. Additionally with respect to polyvinyl alcohols, and also where such comonomers are used, reactive precursors may be used to form blends according to embodiments herein that are melt processable (e.g., melt extrudable), negating the need for expensive water evaporation to form the desired oxidizing chemical stable films and coatings. Even where solution processing is used, blends according to embodiments herein may form desirable films and coatings for use with oxidizing chemicals.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A water soluble film or coating, comprising:
   a water soluble polymer; and
   a reactive precursor comprising an alkanolamine or an alkyl alkanolamine, wherein the amine is a secondary or tertiary amine, and wherein the amine includes a secondary or tertiary alkanol group;
   wherein the reactive precursor is water soluble and the alkanolamine or the alkyl alkanolamine is reactive with an oxidizing compound.

2. The water soluble film or coating of claim 1, wherein the water soluble polymer comprises a polyvinyl alcohol, a polyvinyl alcohol copolymer, or mixtures thereof.

3. The water soluble film or coating of claim 1, wherein the film or coating has an initial moisture content in the range from about 6 to about 12 wt %.

4. The water soluble film or coating of claim 1, wherein the reactive precursor further comprises a polyvinyl alcohol or polyvinyl alcohol copolymer having a degree of polymerization of less than 150.

5. The water soluble film or coating of claim 1, wherein the reactive precursor further comprises one or both of a sultbnate modified polyvinyl alcohol copolymer or an amine modified polyvinyl alcohol having a degree of polymerization in the range from about 40 to about 130.

6. The water soluble film or coating of claim 1, wherein the reactive precursor comprises diisopropanol amine, triisopropanol amine, N,N,N',N'-tetrakis(2-hydroxypropyl) ethylene diamine, 2-(methylamino)ethanol, methyl isopropanolamine, dimethyl isopropanolamine, ethyl isopropanolamine, methyl ethyl isopropanolamine, methyl diisopropanol amine, or mixtures thereof.

7. The water soluble film or coating of claim 1, wherein the reactive precursor is present at a concentration in the range from about 0.5 wt % to about 25 wt %.

8. The water soluble film or coating of claim 1, further comprising a poloxamer surfactant.

9. A water soluble film or coating, comprising:
   less than 14 wt % water;
   greater than 65 wt % of a water soluble polymer; and
   greater than 5 wt % of a reactive precursor comprising an alkanolamine or an alkyl alkanolamine, wherein the amine is a secondary or tertiary amine, and wherein the amine includes a primary, secondary or tertiary alkanol group;
   wherein the reactive precursor is water soluble and the alkanolamine or the alkyl alkanolamine is reactive with an oxidizing compound.

10. The water soluble film or coating of claim 9, comprising at least 15 wt % reactive precursor.

11. The water soluble film or coating of claim 9, further comprising at least 5 wt % of a poloxamer surfactant.

12. The water soluble film or coating of claim 9, wherein the water soluble polymer comprises a polyvinyl alcohol, a polyvinyl alcohol copolymer, or mixtures thereof.

13. A water soluble film or coating for use in unit dose packaging, comprising:
   6 wt % to less than 14 wt % water;
   greater than 65 wt % of a water soluble polymer consisting essentially of a polyvinyl alcohol or a mixture of polyvinyl alcohols having a degree of hydrolysis in the range from about 70 to about 99%;
   an additive mixture comprising one or more of an alkanolamine or an alkyl alkanolamine, wherein the amine is a secondary or tertiary amine, and wherein the amine includes a primary, secondary or tertiary alkanol group;
   wherein the reactive precursor is water soluble and the alkanolamine or the alkyl alkanolamine is reactive with an oxidizing compound.

14. The water soluble film or coating of claim 13, wherein the additive mixture further comprises a primary alcohol amine, an amino acid, a secondary alcohol, or mixtures thereof.

15. The water soluble film or coating of claim 13, comprising up to 40 wt % of the additive mixture.

16. The water soluble film or coating of claim 13, wherein the additive mixture further comprises one or more of a surfactant, a water-soluble saccharide, a water-soluble starch, a halogen scavenger, citric acid, or a plasticizer.

17. The water soluble film or coating of claim 16, wherein the surfactant comprises a poloxamer and is present at a content of at least 3 wt %.

18. A unit dose package comprising:
   a polymeric dissolution packet comprising the film of claim 1; and
   a chemical sealed in the polymeric dissolution packet.

19. A unit dose package comprising:
   a polymeric dissolution packet comprising the film of claim 9; and
   a chemical sealed in the polymeric dissolution packet.

20. A unit dose package comprising:
   a polymeric dissolution packet comprising the film of claim 13; and
   a chemical sealed in the polymeric dissolution packet.

* * * * *

UNITED STATES PATENT AND TRADEMARK OFFICE
CERTIFICATE OF CORRECTION

PATENT NO. : 9,796,870 B2
APPLICATION NO. : 15/255814
DATED : October 24, 2017
INVENTOR(S) : Richard Vicari et al.

It is certified that error appears in the above-identified patent and that said Letters Patent is hereby corrected as shown below:

In the Claims

At Column 28, Claim number 5, Line number 13, the word "sultbnate" should read -- sulfonate --.

Signed and Sealed this
Thirteenth Day of March, 2018

Andrei Iancu
*Director of the United States Patent and Trademark Office*